US008210106B2

(12) United States Patent
Tai et al.

(10) Patent No.: US 8,210,106 B2
(45) Date of Patent: Jul. 3, 2012

(54) ADJUSTABLE CAB ISOLATOR BRACKET

(75) Inventors: Steven Tai, Chicago, IL (US); Michael Oddie, Palos Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 213 days.

(21) Appl. No.: 12/392,693

(22) Filed: Feb. 25, 2009

(65) Prior Publication Data

US 2009/0212192 A1 Aug. 27, 2009

Related U.S. Application Data

(60) Provisional application No. 61/031,659, filed on Feb. 26, 2008.

(51) Int. Cl.
*B61C 17/00* (2006.01)

(52) U.S. Cl. ........................................ 105/453; 105/456

(58) Field of Classification Search .................. 105/463, 105/456, 453, 199.1, 199.2, 199.3, 463.1; 384/595, 423; 267/221, 286, 3, 4, 140.2, 267/177; 280/5.514, 6.157
See application file for complete search history.

(56) References Cited

U.S. PATENT DOCUMENTS

| 2,540,525 | A | | 2/1951 | Howarth | |
|---|---|---|---|---|---|
| 2,625,388 | A | * | 1/1953 | Herreshoff et al. | 267/286 |
| 3,563,526 | A | * | 2/1971 | Mui | 267/178 |
| 3,773,320 | A | | 11/1973 | Samiran et al. | |
| 4,103,881 | A | | 8/1978 | Simich | |
| 4,784,400 | A | | 11/1988 | Hofius | |
| 5,306,031 | A | * | 4/1994 | Quinn et al. | 280/6.15 |
| 5,553,836 | A | * | 9/1996 | Ericson | 267/286 |
| 6,637,348 | B1 | | 10/2003 | Teichmann et al. | |
| 6,857,780 | B2 | | 2/2005 | Morr et al. | |
| 7,168,370 | B2 | | 1/2007 | Hommen et al. | |
| 7,263,802 | B2 | | 9/2007 | Fitzgibbon | |
| 2003/0030204 | A1 | | 2/2003 | Chou | |
| 2007/0182079 | A1 | | 8/2007 | Fang | |
| 2008/0099968 | A1 | * | 5/2008 | Schroeder | 267/166 |

\* cited by examiner

*Primary Examiner* — Mark Le
(74) *Attorney, Agent, or Firm* — Eugene Cummings

(57) ABSTRACT

An adjustable cab isolator bracket is provided for adjusting the height of an isolated cab of a locomotive. Alternatively, the adjustable bracket may adjust spring loading of an isolated locomotive cab. The adjustable cab isolator bracket generally comprises a spring retainer adapted to engage a spring and mountable to the underframe, and a bracket body for receiving and engaging the spring retainer and mountable to the cab. The adjustable bracket may further be fixed to the isolated locomotive cab. In this arrangement, the bracket body is adapted to receive and engage at least a portion of the spring retainer. The engagement between the spring retainer and the bracket body is adaptable to selectively adjust a portion of the spring retainer to be received by the bracket body in relation to a spring, thereby adjusting cab height or spring loading in relation to the underframe.

11 Claims, 9 Drawing Sheets

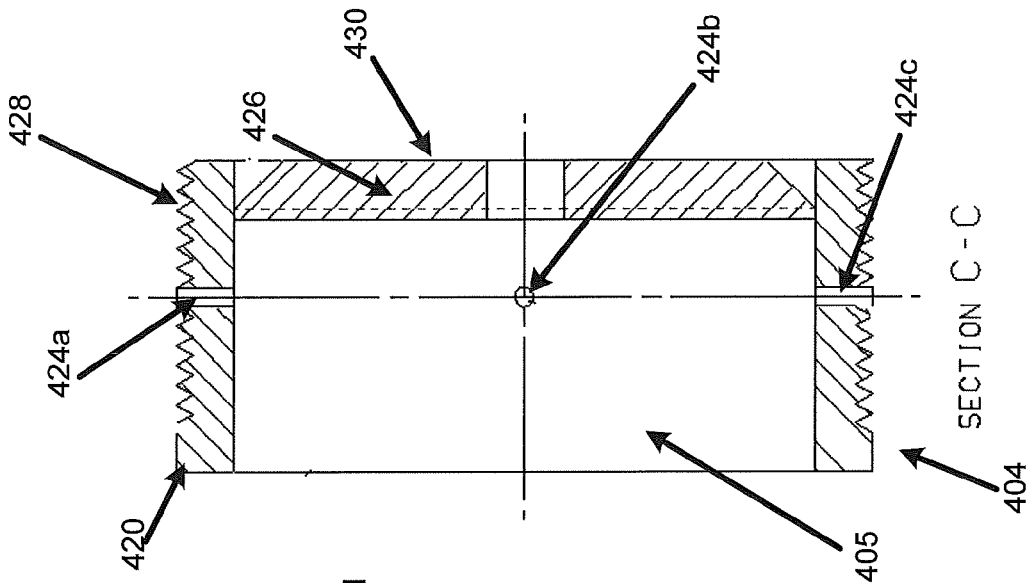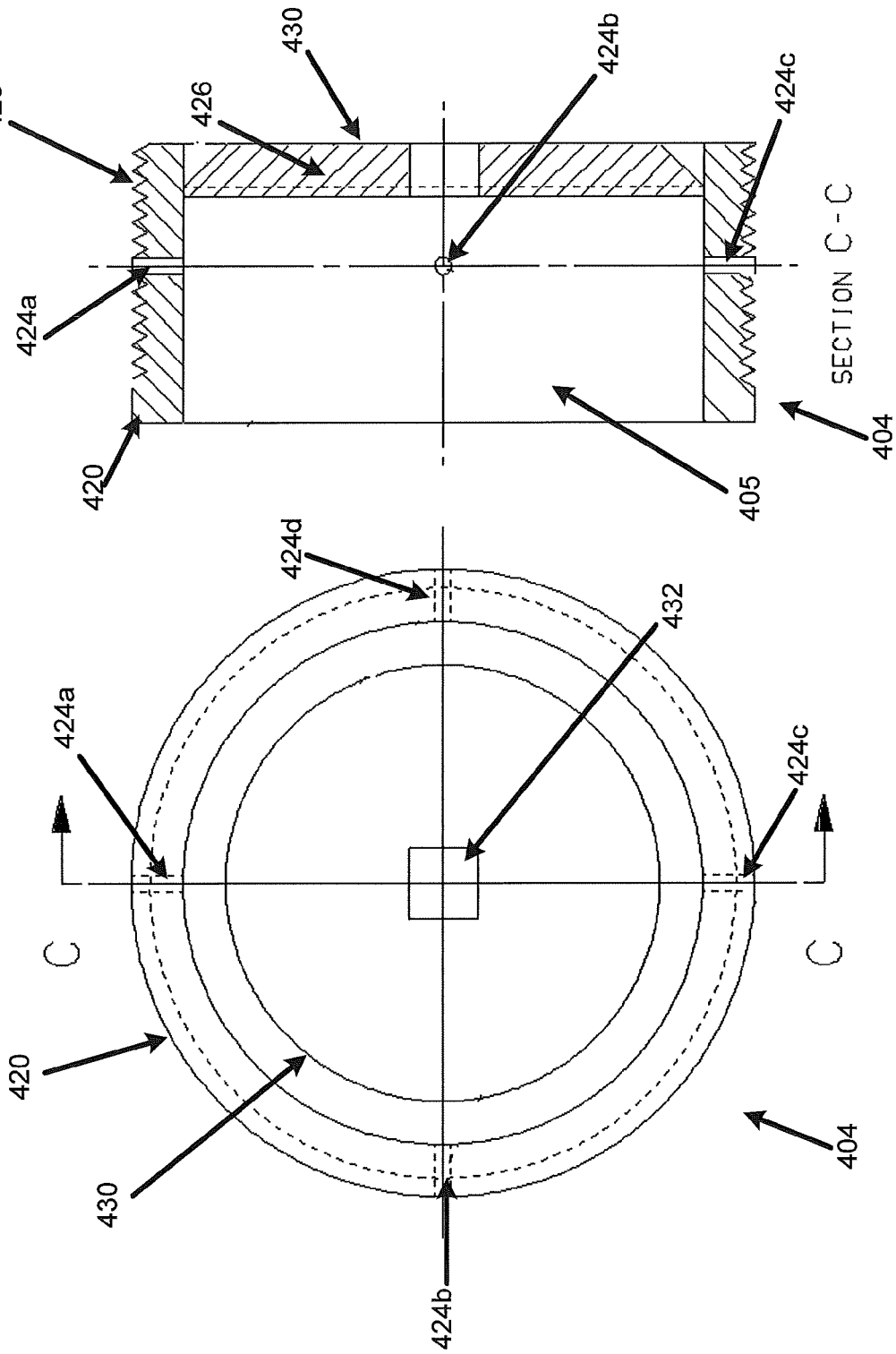

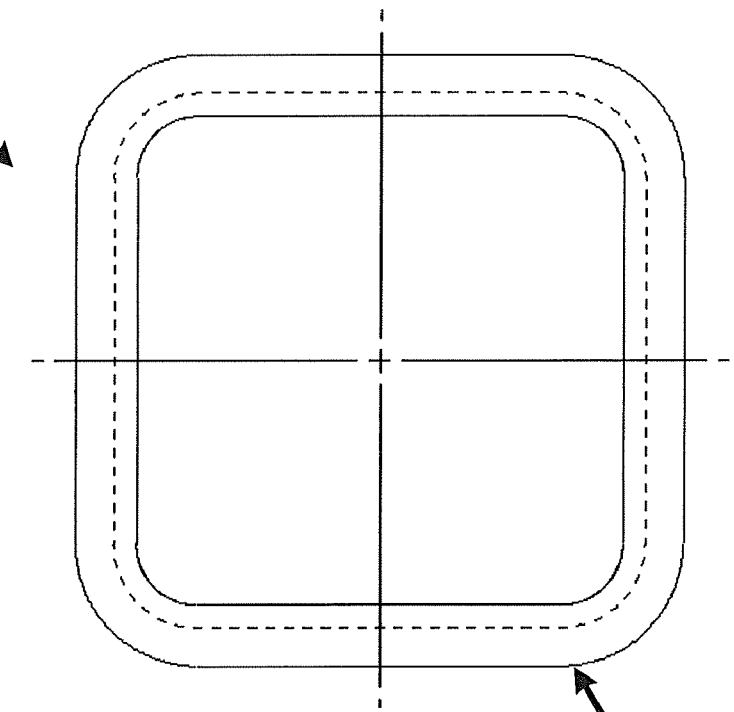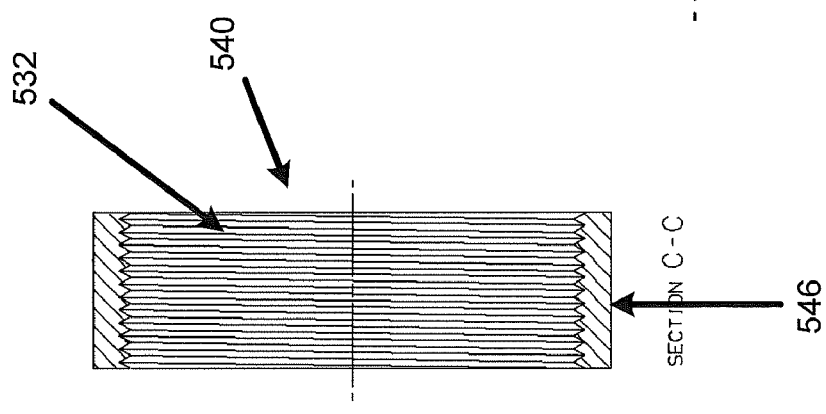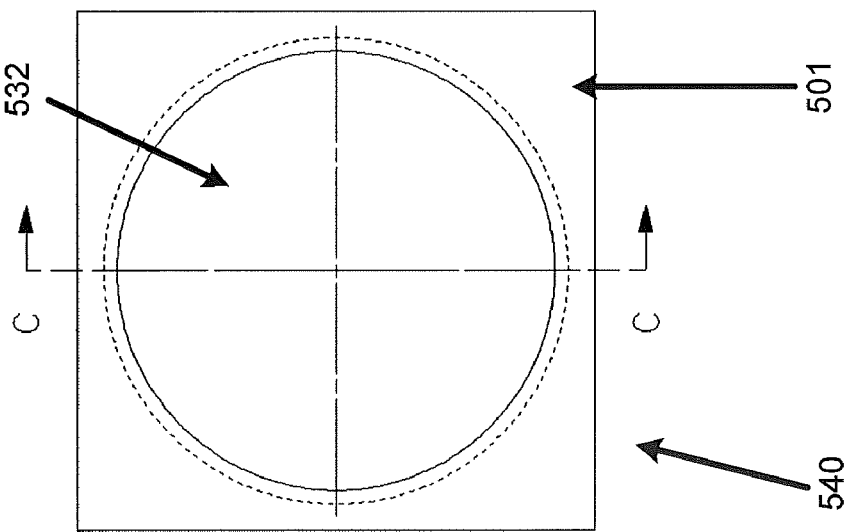

ADJUSTABLE CAB ISOLATOR BRACKET

CROSS-REFERENCE TO RELATED APPLICATIONS

The present patent application is a non-provisional application claiming the benefit under 35 U.S.C. §119(e) of U.S. Provisional Application Ser. No. 61/031,659, filed Feb. 26, 2008 and entitled "CAB ISOLATOR BRACKET."

BACKGROUND OF THE INVENTION

The present invention generally relates to a locomotive and, more specifically to an adjustable cab isolator bracket for use in a locomotive cab isolation system.

Some locomotives include cab isolation systems, which detach the cab from the effects of vibration transferred by the underframe. This arrangement reduces engine induced structure-borne vibration and noise transferred into the cab.

Included in this cab isolation system is at least one pivot 122, as shown in FIG. 1, generally located near the rear of the isolated cab. The pivot 122 may be in the form of a rubber bushing. The rear pivot 122 may also be selected to control the frequency and magnitude of vertical, lateral and longitudal natural frequencies near the rear of the cab.

As shown in FIG. 1, and more particularly in FIG. 2, another component of this cab isolation system is the application of at least one coil spring arrangement in the form of a cab isolator bracket 100, 200 operatively engaging a spring 102, 202 respectively and generally located near the front of the cab. The cab isolator bracket 100, 200 and spring 102, 202 may be vertically oriented at each corner of the front of the locomotive. The cab isolator bracket 100, 200 is generally mounted to the underframe 110 of the locomotive, preferably via the short hood 112, 212. The spring 102, 202 may be in the form of any kind of spring (e.g. steel spring, coil spring, leaf spring, airbag, rubber pad, or any other comparable spring). The primary function of the spring 102, 202 is to maintain a defined stiffness in the axial direction. For example, the spring 102, 202 may be designed to tune a rigid body mode to occur at a specific frequency. Spring stiffness may be generally set to establish a cab rigid body mode (e.g. cab pitch) to occur at a frequency which is above most of the bogie suspension frequencies and the primary track input frequencies, but below underframe first bending.

Additionally, as illustrated in FIG. 2, the cab isolation system may include at least one damper 206 located near the front of the locomotive cab to be used in conjunction with the cab isolator bracket 200 and spring 202 arrangement. The damper 206 may be positioned to be along the path of the arc swing of the cab, as defined by the rear pivots (e.g., 122 in FIG. 1). The damper 206 may generally serve to reduce or eliminate magnification of low frequency motions such as those typically generated by the response of the locomotive suspension and the cab to track induced forces.

Proper cab clearance height adjustment or adjustment in the loading of the spring in a cab isolator bracket is necessary (1) to account for the build tolerance of the cab and cab application on the locomotive, (2) to assure that there is adequate clearance between the cab and the locomotive underframe to prevent another path for vibration being transferred to the cab other than at the cab isolator bracket connection points, (3) to equalize the distribution of loading on the front springs, and (4) to adjust for a break-in period of new parts. One manner of adjusting cab height or loading of the spring in a cab isolator bracket is by an application of shims to the spring arrangement until the proper cab clearance height is achieved. In traditional cab isolation systems, adjustment of cab height involves the lifting or lowering the front end of the cab in order to apply and/or remove spacer shims above and/or below each of the front springs of the isolated cab. As shown in FIG. 2, these shims (204a, 204b) are located between the spring 202 and the cab isolator bracket 200 and between the spring 202 and the underframe 210, preferably via the short hood 212.

Because adjustment of cab height has traditionally been tedious and difficult due to the necessity of lifting the entire cab and placing shims above and/or below the spring (e.g., 202), it is an object of the present invention to provide an adjustable cab isolator bracket which allows cab height adjustment without the lifting of an entire cab and without the use of shims.

It is a further object of the present invention adjustable cab isolator bracket to reduce the necessary equipment and resources required for lifting the cab. Traditionally, the crane operation for such a process would prevent others from working while the cab height is being adjusted. The present invention adjustable cab isolator bracket allows the cab height adjustment to be a more portable operation due to lack of constraint for such specialized equipment (e.g. cranes and jacks) and tooling, which allows more flexibility for the completion of the work.

An additional object of the present invention adjustable cab isolator bracket is to provide variable height adjustment features to allow more accurate height adjustment (in contrast to the fixed ⅛" thick shims) without requiring any special skills to perform the task. The height adjustment may be performed by one person, thus allowing others to work on other areas of the locomotive. The cab height mechanism allows for only gradual lifting and lowering of the cab, thus allowing the single operator to safely control the movement of the cab. Additionally, the present invention prevents damage to the bracket by incorporating visual indicators for the operator to identify when the minimum or maximum adjustable height limit has been reached.

Moreover, because the present invention does not use shims, the cab does not need to be raised from an "at rest" position in order for the operator to reach an open gap between the cab and spring to add or remove shims. An operator may use common tools to adjust the cab height (e.g. ½" ratchet drive, ½" ratchet extension and wrench). Furthermore, because the present invention does not require the use of special tools or shims, there will be a reduction of parts and, as a result, a reduction in cost.

These and other desired benefits of the preferred embodiments, including combinations of features thereof, of the invention, will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the multiple embodiments of the invention, not necessarily the invention in general.

SUMMARY OF THE INVENTION

In accordance with the invention, an adjustable cab isolator bracket arrangement is provided for adjusting the height of an isolated cab of a locomotive. Alternatively, the adjustable cab isolator bracket may provide for adjusting the loading of a spring which engages the bracket. The cab isolator bracket arrangement generally comprises a spring retainer adapted to engage a spring and mountable to the underframe, preferably via the short hood, and a bracket body for receiving and engaging the spring retainer and mountable to the cab. In this arrangement, the bracket body is adapted to receive and engage at least a portion of the spring retainer. The engagement between the spring retainer and the bracket body is adaptable to selectively adjust a portion of the spring retainer to be received by the bracket body in relation to a spring, thereby adjusting cab height or otherwise the loading of the spring in relation to the underframe, preferably via the short hood.

It should be understood that the present invention includes a number of different aspects or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

BRIEF DESCRIPTION OF THE DRAWINGS

FIG. 4A is a top view of the spring retainer of FIGS. 3A and 3B.

FIG. 4B is a cross-sectional view of the spring retainer of FIG. 4A taken at C-C.

FIG. 5A is a top view of the lower body of the bracket of the adjustable cab isolator bracket shown in FIGS. 3A and 3B.

FIG. 5B is a cross-sectional view of the lower body of the bracket of FIG. 5A taken at C-C.

FIG. 5C is a top view of the main body of the adjustable cab isolator bracket shown in FIGS. 3A and 3B.

DETAILED DESCRIPTION OF THE INVENTION

Figure 1:
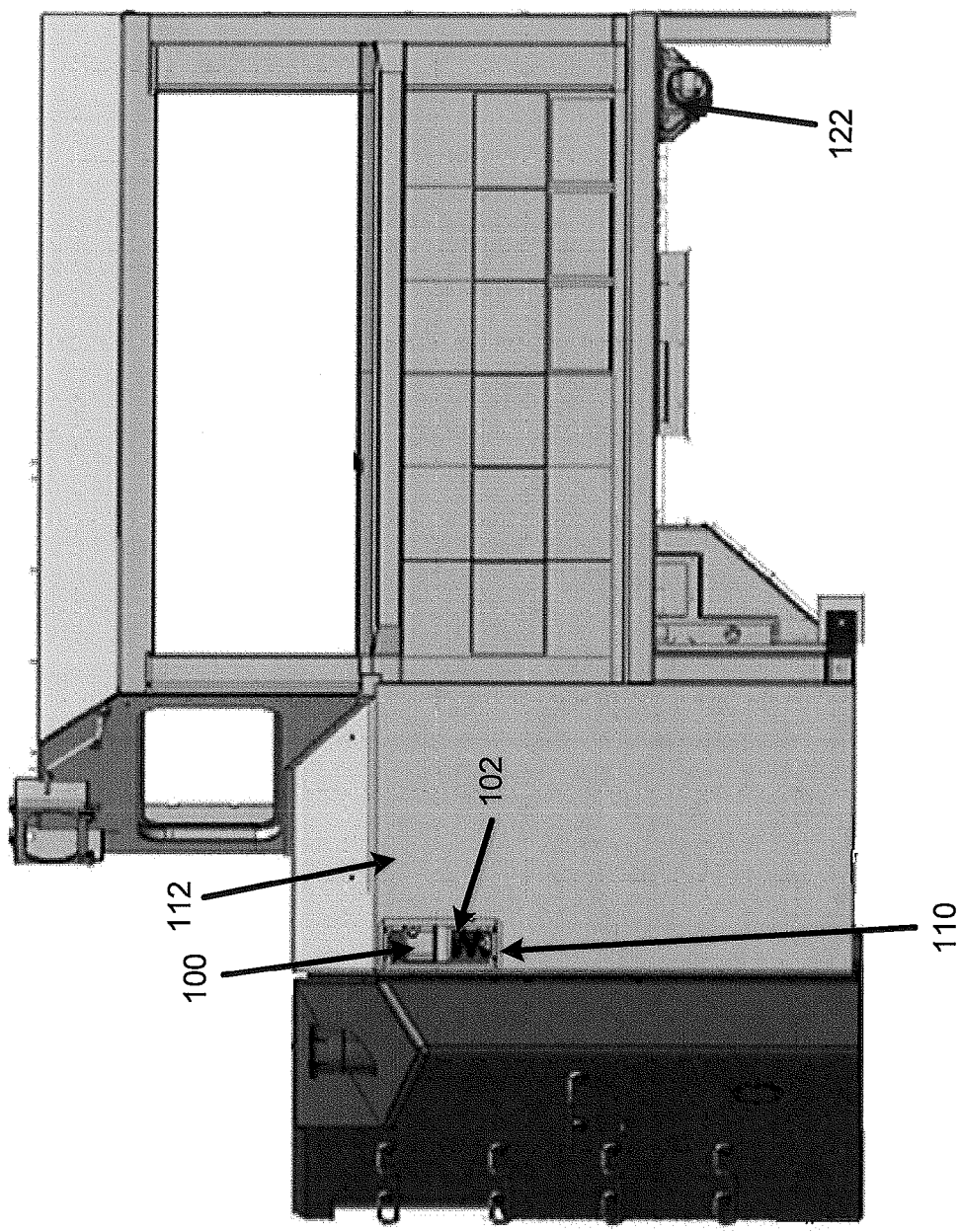
FIG. 1 is a side view of a prior art cab isolation system.
Figure 2:
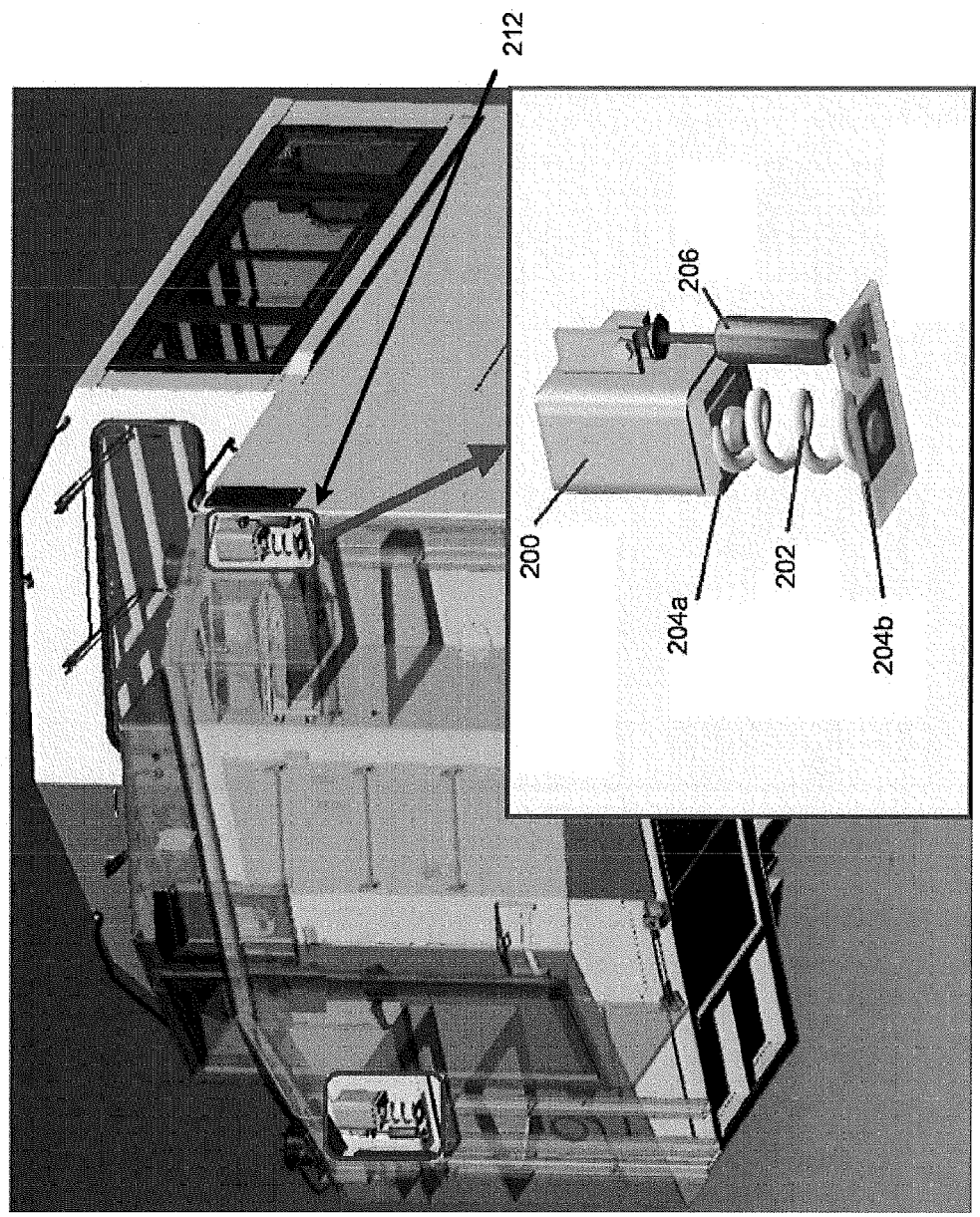
FIG. 2 is a perspective view of an embodiment of the prior art cab isolation system of FIG. 1.
Figure 3A:
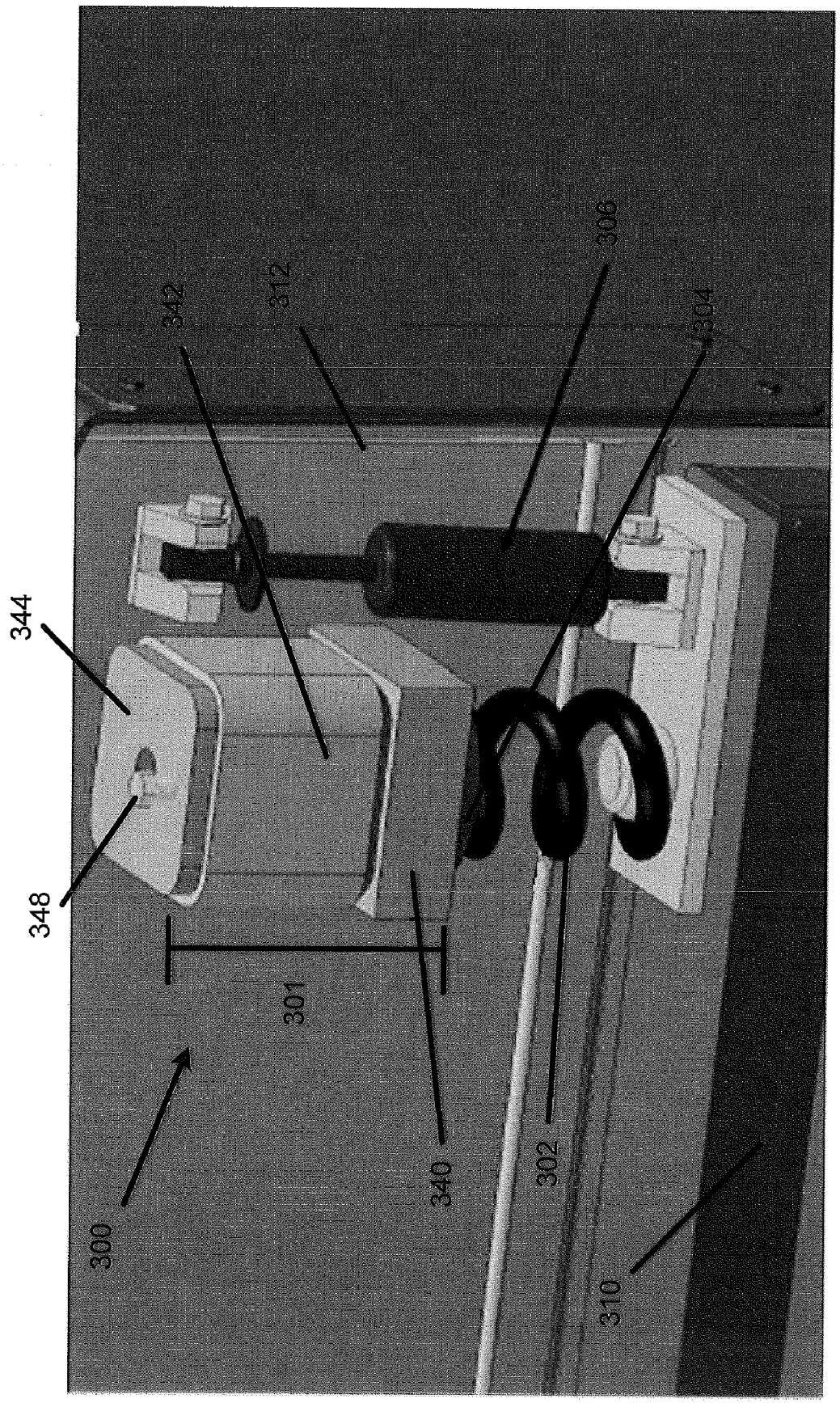
FIG. 3A is a perspective view of an embodiment of a present invention adjustable cab isolator bracket, for use in the cab isolation system of FIG. 1.
Figure 3B:
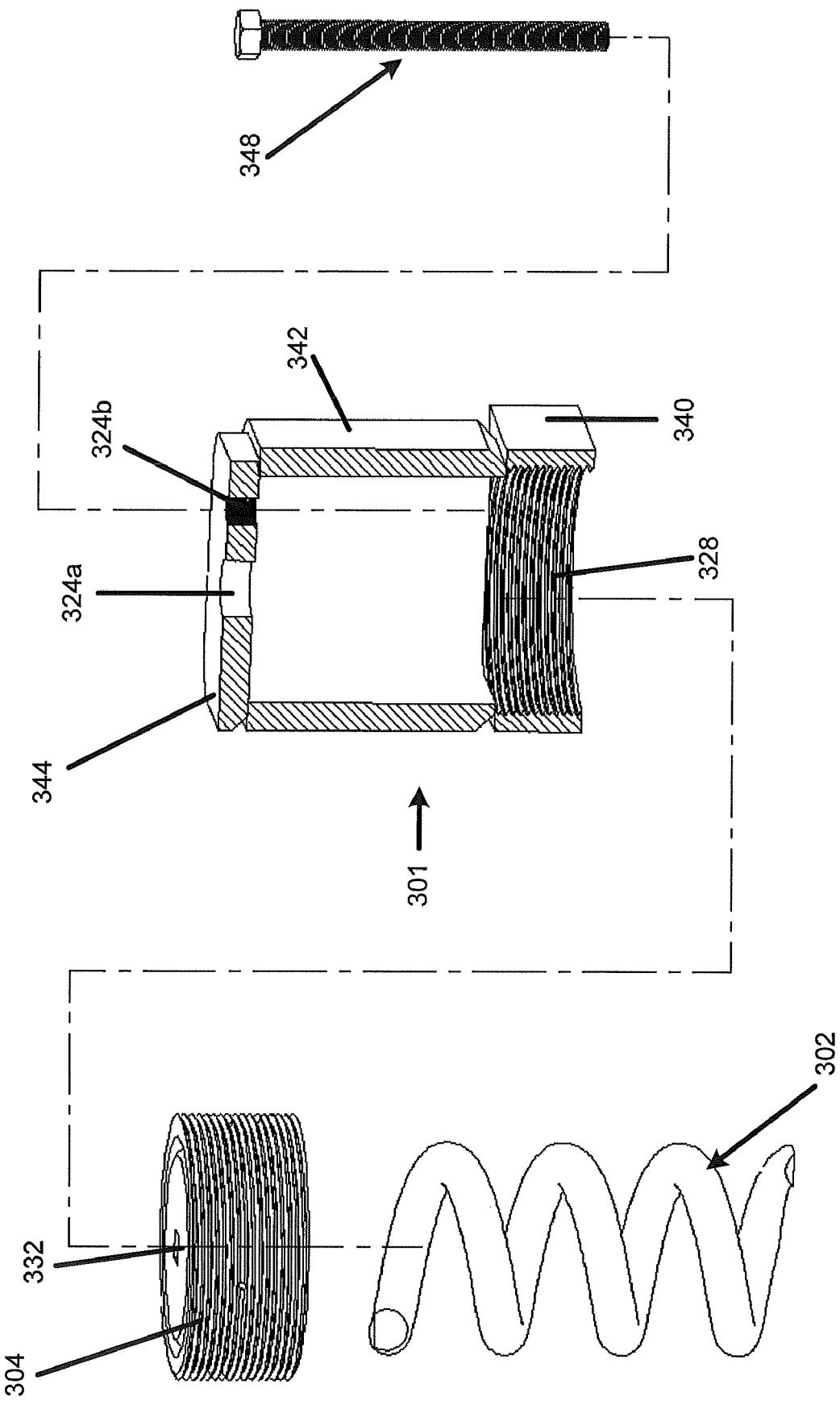
FIG. 3B is an exploded cross-sectional view of the present invention adjustable cab isolator bracket of FIG. 3A.

FIGS. 3A and 3B illustrate an embodiment of the present invention, where an adjustable cab isolator bracket 300 is provided for adjusting the height of an isolated locomotive cab mounted to an underframe 310. The adjustable cab isolator bracket 300 may also be used to adjust the loading of a spring 302 which engages the cab isolator bracket 300. This present invention adjustable cab isolator bracket 300 may be used in place of the prior art cab isolator bracket of FIGS. 1 and 2. The adjustable cab isolator bracket 300 comprises a spring retainer 304 adapted to engage a spring 302, and a bracket body 301 for receiving and engaging the spring retainer 304. The spring retainer 304 may be in the form of a cap which retains a portion of the spring 302 and engages the spring 302. Engagement between the spring retainer 304 and the bracket body 301 is adaptable such that selectively adjusting the portion of spring retainer 304 received by the bracket body 301 in relation to the spring 302 adjusts cab height or the loading of spring 302. In this embodiment, the spring retainer 304 is generally mountable to the underframe 310, preferably via the short hood 312. In an alternative embodiment, the adjustable cab isolator bracket 300 may be arranged such that it causes the direct engagement between the cab and the underframe 310, without directly engaging the short hood 312.

Additionally, the present invention adjustable cab isolator bracket 300 includes a bracket body 301 mountable to the isolated locomotive cab, which is adapted to receive and operatively engage at least a portion of the spring retainer 304. The engagement between the spring retainer 304 and the bracket body 301 is adaptable to selectively adjust the portion of the spring retainer 304 to be received by the bracket body 301 in relation to the spring 302, which in turn adjusts cab height in relation to the underframe 310, preferably via the short hood 312. The adjustment of the portion of the spring retainer 304 to be received by the bracket body 301 in relation to the spring 302 may also adjust the loading of the spring 302.

FIG. 3B is an exploded disassembled view of the present invention system of FIG. 3A. FIG. 3B illustrates the adjustable cab isolator bracket including a bracket body 301 comprised of a lower body 340, a main body 342, and a cover 344. The spring retainer 304 operatively engages the lower body 340 of the adjustable bracket 300, via threading defined in the outer periphery of the spring retainer 304 and corresponding threads 328 defined in the inner periphery of the lower body 340 of the bracket 300. The spring retainer 304 may alternatively engage the lower body 340 in other ways, such as fastening (not shown). The cover 344 of the bracket 300 may be comprised of a plate 330 defining a plurality of apertures 324a, 324b. The first aperture 324a may be generally located near the center of the plate 330 and sized and shaped to receive the diameter of a ratchet extension. The second aperture 324b may be threaded to operatively engage a securing member 348 (e.g., locking bolt) used to lock the spring retainer 304 into position after cab height or spring loading adjustment.

The spring retainer 404 may be constructed from a cylindrical body and circular plate to define a region 405 for retaining a portion of a spring. In one arrangement, as shown in FIGS. 4A and 4B, the outer surface of the cylindrical body 420 is threaded 428 and visual indicator apertures 424a, b, c, d are defined at select locations on the circumference of the cylindrical body 420. These visual indicators 424a, b, c, d may be used to indicate the height of the locomotive cab and/or as warning indicators to indicate that the maximum or minimum height of the locomotive cab has been reached. The indicators 424a, b, c, d may additionally include a mechanical limit to prevent further adjustments when the maximum or minimum height has been reached. Alternatively, the visual indicators may be used to indicate the loading of the spring and/or indicate when the maximum or minimum spring loading has been reached.

In one embodiment, the circular plate 430 may be inserted into the one end opening of the cylindrical body 420 and may be welded into place along the chamfered edge 426 of the circular plate 430. By applying the weld on the chamfered side 426 of the circular plate 430, weld interference can be avoided and assure that the spring can be seated properly inside the cap. The circular plate 430 may define an aperture 432 with a select shape and size (e.g. square as shown in FIG. 4A) for receiving and operatively engaging a ratchet extension that has a corresponding size and shape. For example, the aperture diameter may be sized to receive a ½ drive ratchet wrench extension. The ratchet extension may be used to adjust the engagement between the spring retainer and the bracket body by engaging the spring retainer and causing it to rotate inside the bracket body. The rotation of the spring retainer, in turn, causes it to move upwards or downwards inside the bracket body, thereby directly adjusting the cab height or spring loading. Alternatively, the engagement between the spring retainer and the bracket body may be in the form of a telescoping mechanism (not shown). The spring retainer may be constructed of a suitable material (e.g. steel).

As shown in FIGS. 5A and 5B, an aperture 532 may be defined in the bracket body 501 and threaded 528 for engagement of the threaded body (e.g. 420 of FIG. 4A and 4B) of the spring retainer 504. As shown in FIG. 5C, the main body 542 may include a generally flat surface, which may be easily mounted to the cab. Alternatively, the main body 542 may be generally cylindrical (not shown).

Figure 5E:
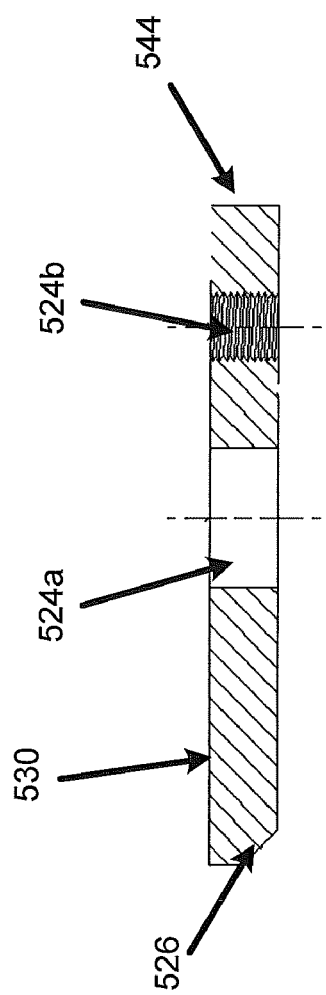
FIG. 5E is a cross-sectional view of the cover of the bracket as shown in FIG. 5D taken at B-B.
Figure 5D:
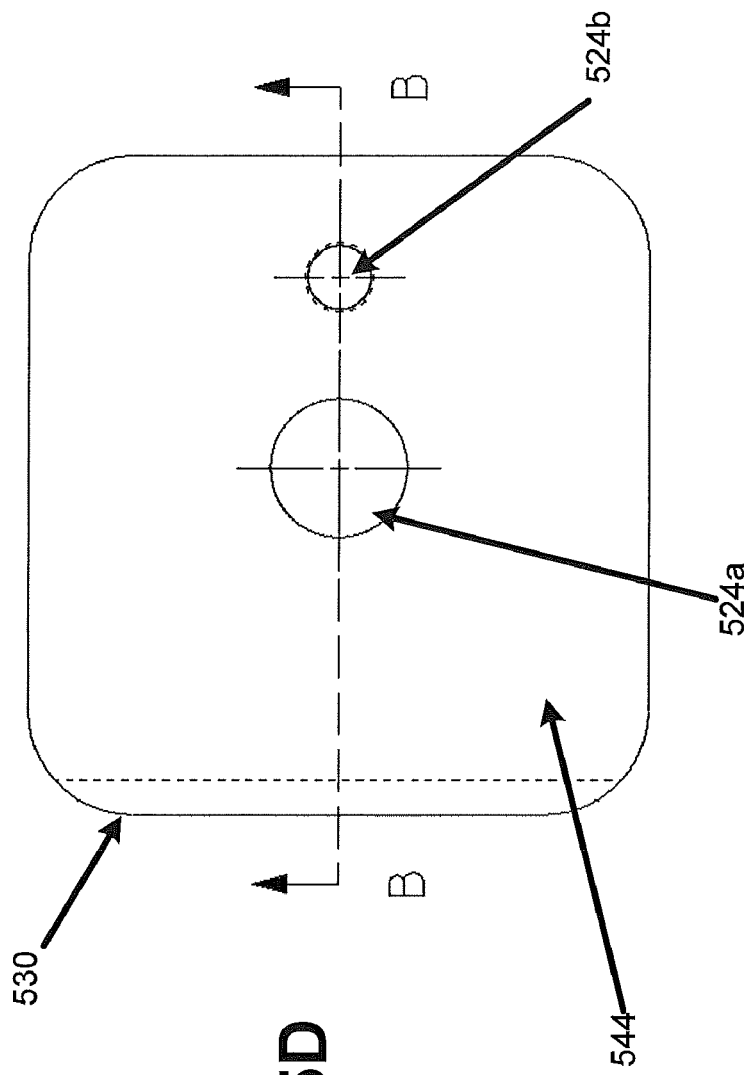
FIG. 5D is a top view of the cover of the adjustable cab isolator bracket shown in FIGS. 3A and 3B.

FIGS. 5D and 5E show the cover 544 of the bracket body 501 comprising a plate 530 defining a plurality of apertures 524a, 524b. The first aperture 524a may be generally located near the center of the plate 530 and sized and shaped to receive and operatively engage a ratchet extension (e.g. socket wrench), which may be correspondingly sized and shaped. For example, the diameter of the ½" drive ratchet extension may be 1 inch. The second aperture 524b may be sized and shaped to receive a securing member (such as a ½" bolt), which is used to lock the spring retainer into position after cab height adjustment or adjustment of spring loading. The securing member may be threaded on its outer periphery to engage the cover 544 via its second aperture 524b, which is threaded on its inner periphery. The second aperture 524b may be generally located on the centerline of the plate 530 but away from the first aperture 524a. A chamfer 526 is applied to the plate 530 on the opposite edge of the second aperture 524b. This chamfer 526 allows the plate 530 to be welded and aligned flush with one of the surfaces of the main body 542.

Figure 6:
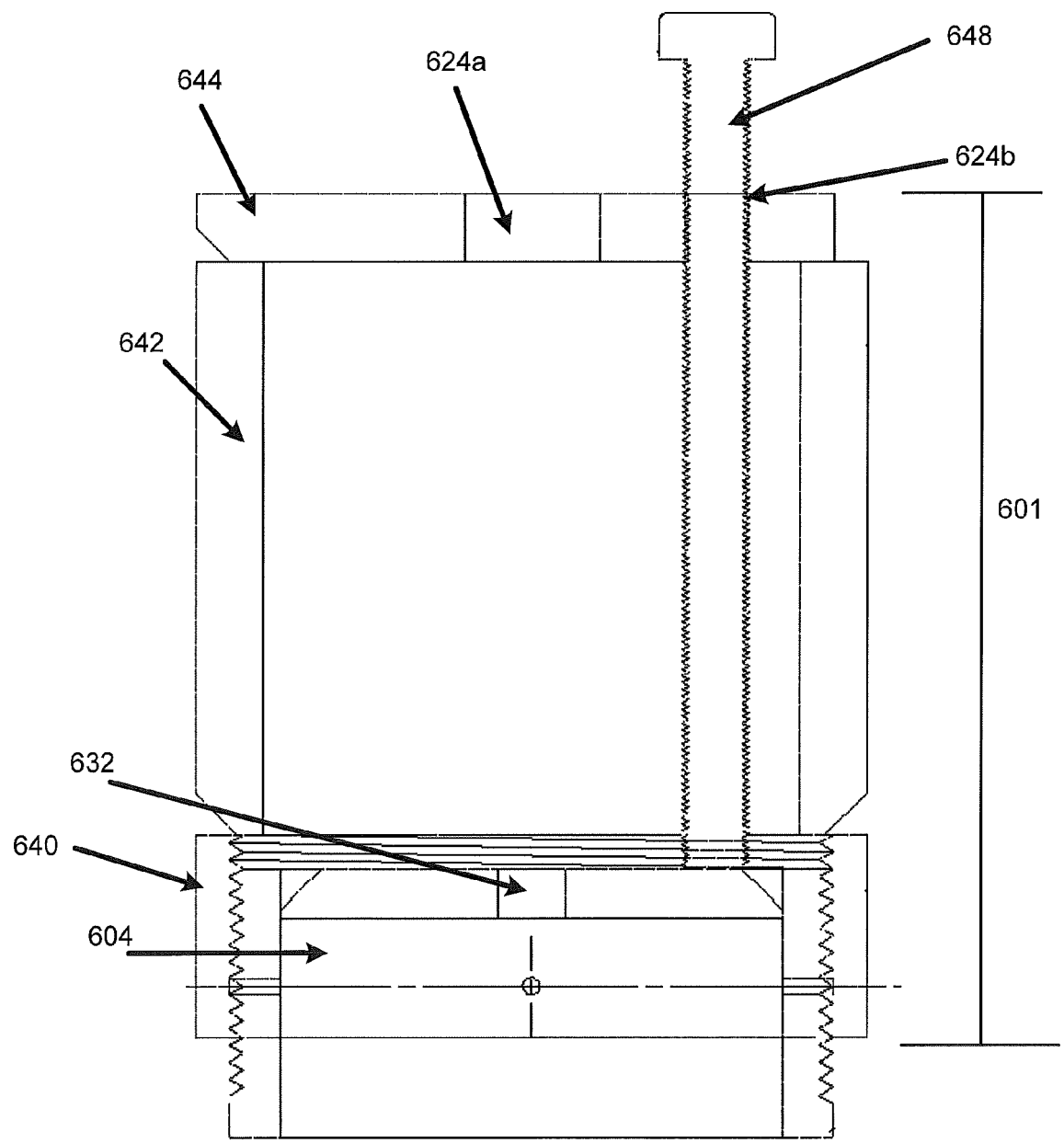
FIG. 6 is a cross-sectional view of the present invention cab isolator bracket.

FIG. 6 illustrates the engagement between the spring retainer 604, the bracket body 601 and a securing member 648. The spring retainer 604 is received by the lower body 640 of the adjustable cab isolator bracket 600, which has been threaded so as to operatively engage the spring retainer 604. This engagement between the spring retainer 604 and the bracket body 601 is adaptable to selectively adjust a portion of the spring retainer 604 to be received by the bracket body 601 in relation to a spring (which the spring retainer 604 engages), resulting in the adjustment of cab height in relation to the underframe, preferably via the short hood (not shown). The adjustment of the portion of the spring retainer 604 to be received by the bracket body 601 may also adjust the loading of the spring (not shown).

For example, the cover 644 of the adjustable bracket 600 may receive a ratchet extension via its first aperture 624a, where the ratchet extension extends through the main body 642 to engage the spring retainer 604. The spring retainer 604 may define an aperture 632 that has a select shape and size corresponding to the shape and size of the ratchet extension (i.e. the square cut out shown in FIG. 4A). Thus, when the ratchet extension is received by the spring retainer 604 via the spring retainer's aperture 632, the ratchet extension is able to operatively engage the spring retainer 604 and cause it to rotate inside the lower body 640 of the adjustable bracket 600. The rotation of the spring retainer 604 in turn causes it to move upwards or downwards inside the bracket body 600, thereby directly adjusting the cab height or spring loading.

Alternatively, the engagement between the spring retainer 604 and the lower body 640 may be in the form of a telescoping mechanism (not shown).

Additionally, the present invention may include a securing member 648 that may be in the form of a locking bolt. The securing member 648 is threaded through the second aperture 624b of the cover 644 of the adjustable cab isolator bracket 600 and is used to apply an offset load onto the spring retainer 604 to lock it into position.

Figure 7:
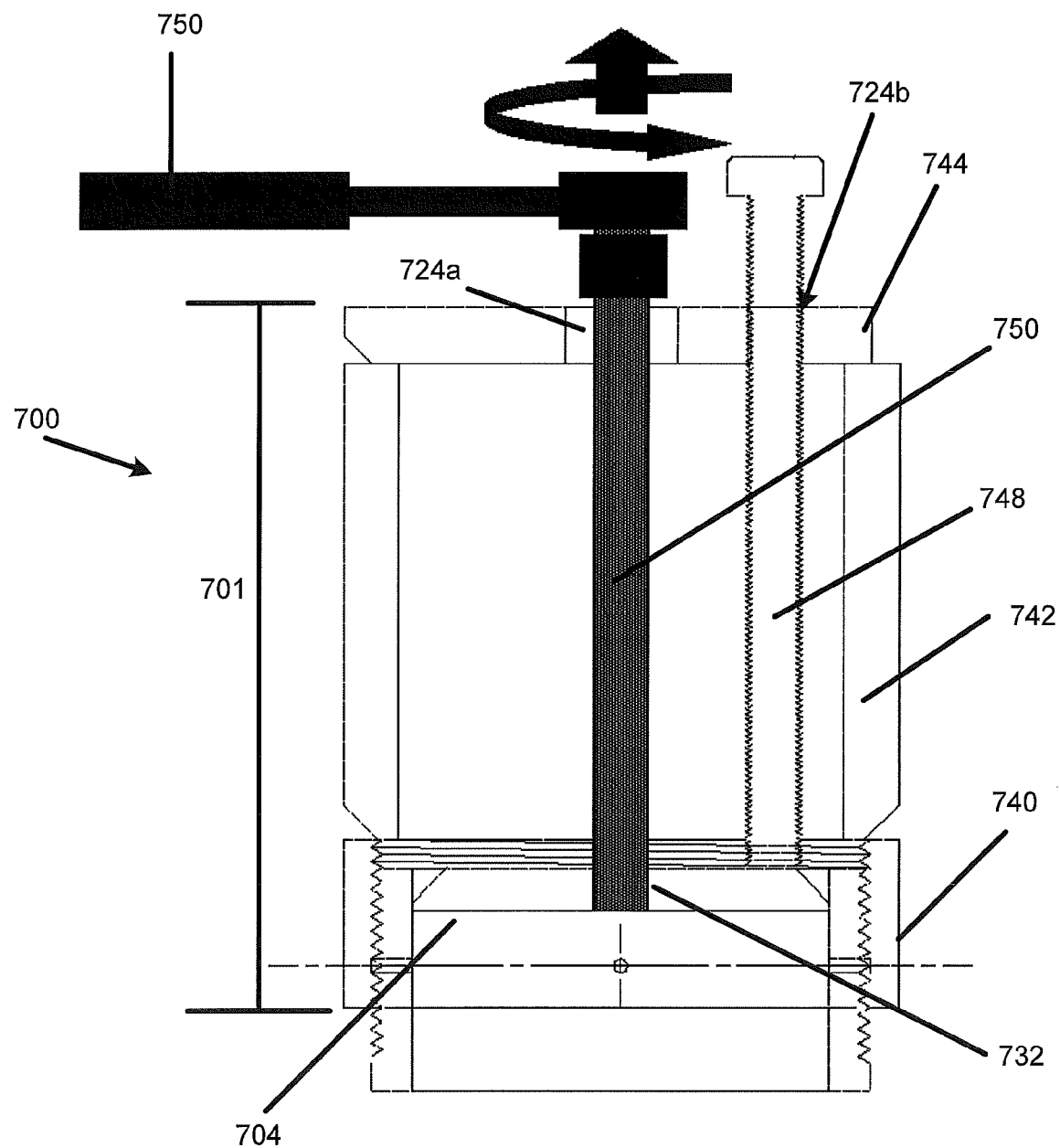
FIG. 7 is a cross-sectional view of the present invention adjustable cab isolator bracket.

FIG. 7 illustrates an example of how to employ the present invention for height adjustment of a locomotive cab or adjustment of spring loading. In this example, a securing member 748 (which has been threaded through the second aperture 724b of the bracket cover 744) is loosened in order to allow the spring retainer 704 to rotate freely in the bracket body 701. The securing member 748 is raised by at least a minimum of about ½" from the top of the spring retainer 704. A ratchet tool 750 is then inserted into the first aperture 724a of the cover 744 and extends through the main body 742 of the adjustable cab isolator bracket 700 to be received by the aperture 732 defined in the spring retainer 704 such that the ratchet tool 750 may operatively engage the spring retainer 704 and rotate it. The spring retainer 704 may define an aperture 732 having a select shape and size corresponding to the shape and size of the ratchet tool extension 750. In this example, the spring retainer 704 may be rotated in the counter-clockwise direction in order to raise the height of the cab (as shown) or otherwise decrease spring loading. To lower the height of the cab or increase spring loading, the spring retainer 704 may be rotated in the clockwise direction. The change in cab height or spring loading may be ascertained by measuring the distance between the bottom of the lower body 740 and the bottom of the spring retainer 704. Once the appropriate cab clearance height or spring loading has been achieved, the securing member 748 (e.g., locking bolt as shown in FIG. 7) is tightened to prevent the spring retainer 704 from rotating freely in the bracket body 701. Alternatively, the engagement between the spring retainer 704 and the lower body 740 may be in the form of a telescoping mechanism.

Embodiments of the present invention relate to an isolated locomotive cab, and more specifically, to an adjustable cab isolator bracket for adjusting height of the isolated cab. Alternatively, the present invention adjustable cab isolator bracket may be used to adjust cab loading of the spring, wherein the engagement between the spring retainer and the bracket body is adaptable to selectively adjust a portion of the spring retainer to be received by the bracket body in relation to the spring, thereby balancing the cab loading on both front springs. This embodiment may include a level indicator for indicating the pitch of the locomotive cab and a diagnostic spring indicator for indicating the serviceable life of the spring. Additionally, the adjustable cab isolator bracket may be motorized or use pneumatic pressure to assist in cab height or spring loading adjustment.

The above description is presented to enable one of ordinary skill in the art to make and use the invention and is provided in the context of a patent application and its requirements. Modifications to the various embodiments and the generic principles and features described herein will be readily apparent to those skilled in the art. For example, although the various embodiments show the cab isolator bracket comprised of a material of steel, other materials may be used. Additionally, although the preferred embodiments show the adjustable cab isolator bracket engaging the underframe of the locomotive via the short hood, the underframe may be engaged in other ways. For instance, the underframe may be engaged indirectly without using the short hood, but by other means. Alternatively, the adjustable bracket may directly engage the underframe. Thus, the present invention is not intended to be limited to the embodiments shown, but is to be accorded the widest scope consistent with the principles and features described herein.

What is claimed:

1. A cab isolator bracket adjusting height of an isolated locomotive cab mounted to an underframe, said cab isolator bracket comprising:
   a spring retainer having a cylindrical body that has an inner area retaining a portion of a spring and an outer periphery including threads, said spring being positioned to engage said underframe, and
   a bracket body mounted to said isolated locomotive cab, said bracket body having an inner periphery including threads adapted to receive and engage the threads of at least a portion of the outer periphery of said spring retainer, wherein the spring retainer is configured to rotate into the bracket body to selectively adjust a portion of the spring retainer received by the bracket body in relation to the spring thereby adjusting cab height in relation to said underframe.

2. The cab isolator bracket of claim 1 wherein the spring retainer further includes a height indicator for indicating the height of the locomotive cab.

3. The cab isolator bracket of claim 2, wherein the height indicator further includes a warning indicator for indicating that a maximum or minimum height has been reached.

4. The cab isolator bracket of claim 1 further comprising a securing member for securing the spring retainer to the bracket body.

5. The cab isolator bracket of claim 4, wherein the securing member locks the spring retainer into position after cab height adjustment.

6. The cab isolator bracket of claim 4, wherein the securing member is a locking bolt.

7. The cab isolator bracket of claim 1, wherein the spring retainer further includes an aperture for receiving a ratchet for adjusting the height of the spring therein.

8. The cab isolator bracket of claim 1, wherein the spring retainer defines an aperture for receiving a ratchet extension, wherein rotation of the ratchet extension causes rotation of the spring retainer into and out of the bracket body.

9. A cab isolator bracket adjusting spring loading of an isolated locomotive cab mounted to an underframe, said cab isolator bracket comprising:
   a spring retainer having a cylindrical body having an inner area retaining a portion of a spring and having an outer periphery including threads, and
   a bracket body having an inner periphery including threads that receive and engage the threads of at least a portion of the outer periphery of said spring retainer, wherein the spring retainer is configured to rotate into the bracket body to selectively adjust a portion of the spring retainer received by the bracket body in relation to the spring thereby adjusting spring loading.

10. The cab isolator bracket of claim 9, wherein the adjustment of loading of the spring causes an adjustment in height of the isolated locomotive cab in relation to the underframe of a locomotive, where the cab is mounted to the underframe and the spring engages the underframe.

11. The cab isolator bracket of claim 9, wherein the spring retainer further includes an aperture for receiving a ratchet, which engages the spring retainer and causes rotation thereof thereby adjusting the loading of the spring.

* * * * *